United States Patent
Chen et al.

(10) Patent No.: US 9,069,868 B2
(45) Date of Patent: *Jun. 30, 2015

(54) COMPUTER DEVICE FOR READING E-BOOK AND SERVER FOR BEING CONNECTED WITH THE SAME

(75) Inventors: Li-Ju Chen, Taipei (TW); Gary Chih-Yuan Lin, New Taipei (TW); Chien-Chiao Tu, Taipei (TW); Shih-Yeh Wang, Taipei (TW); Ming-Chun Hsiao, Changhua (TW)

(73) Assignee: International Business Machines Corporation, Armonk, NY (US)

( * ) Notice: Subject to any disclaimer, the term of this patent is extended or adjusted under 35 U.S.C. 154(b) by 84 days.

This patent is subject to a terminal disclaimer.

(21) Appl. No.: 13/450,700

(22) Filed: Apr. 19, 2012

(65) Prior Publication Data

US 2012/0210212 A1     Aug. 16, 2012

Related U.S. Application Data

(63) Continuation of application No. 13/250,805, filed on Sep. 30, 2011.

(30) Foreign Application Priority Data

Sep. 30, 2010   (TW) ................................ 99133468 A

(51) Int. Cl.
   *G06F 17/30*      (2006.01)
   *H04L 29/08*      (2006.01)
   (Continued)

(52) U.S. Cl.
   CPC .......... *G06F 17/30876* (2013.01); *H04L 67/22* (2013.01); *H04L 51/00* (2013.01); *G06F 15/0291* (2013.01); *H04L 67/10* (2013.01)

(58) Field of Classification Search
   CPC ......... H04L 67/10; H04L 67/22; H04L 51/00; G06F 15/0291; G06F 17/30699; G06F 17/30876; G06F 17/30716

USPC ......... 709/203, 217, 219, 223, 227, 246, 204, 709/206; 715/230, 752, 781, 254, 234, 705, 715/753

See application file for complete search history.

(56) References Cited

U.S. PATENT DOCUMENTS

| | | | |
|---|---|---|---|
| 7,020,663 | B2 | 3/2006 | Hay et al. |
| 7,246,118 | B2 | 7/2007 | Chastain et al. |

(Continued)

FOREIGN PATENT DOCUMENTS

| | | |
|---|---|---|
| CN | 1482559 A | 3/2004 |
| CN | 101681350 A | 3/2010 |
| WO | 2009152489 A2 | 12/2009 |

OTHER PUBLICATIONS

Maneesh Madambath, "5 Features I Want E-Book Readers to Bring to the Table," www.watblog.com, Aug. 27, 2009, pp. 1-6.

(Continued)

*Primary Examiner* — Ramy M Osman
(74) *Attorney, Agent, or Firm* — Holland & Knight LLP; Brian J. Colandreo, Esq.; Jeffrey T. Placker, Esq.

(57) ABSTRACT

A device, server, method, and computer program product for reading an e-book are provided. The e-book may include at least a content identifier corresponding to a content in the e-book. The device may include a content navigator configured to present the content according to a command from a user and a processing unit configured to acquire the content identifier corresponding to the content presented by the content navigator, send the content identifier to a server, and receive from the server a message associated with the content. An output unit configured to output the message to the user may be provided.

3 Claims, 4 Drawing Sheets

(51) Int. Cl.
*H04L 12/58* (2006.01)
*G06F 15/02* (2006.01)

(56) References Cited

U.S. PATENT DOCUMENTS

| | | | |
|---|---|---|---|
| 7,350,704 B2 | 4/2008 | Barsness et al. | |
| 8,301,692 B1* | 10/2012 | Hamaker et al. | 709/203 |
| 8,355,955 B1* | 1/2013 | Mirchandani et al. | 705/26.1 |
| 8,428,370 B2* | 4/2013 | Ma et al. | 382/218 |
| 8,434,001 B2 | 4/2013 | Kandekar et al. | |
| 8,462,124 B2* | 6/2013 | Cain et al. | 345/173 |
| 8,554,640 B1* | 10/2013 | Dykstra et al. | 705/26.7 |
| 2002/0087632 A1* | 7/2002 | Keskar | 709/204 |
| 2005/0060266 A1 | 3/2005 | Demello et al. | |
| 2007/0298399 A1* | 12/2007 | Shao et al. | 434/317 |
| 2008/0189608 A1* | 8/2008 | Nurmi | 715/273 |
| 2008/0222295 A1* | 9/2008 | Robinson et al. | 709/227 |
| 2008/0228876 A1 | 9/2008 | Johnson | |
| 2008/0228887 A1 | 9/2008 | Robertson et al. | |
| 2009/0204882 A1 | 8/2009 | Hollander et al. | |
| 2009/0265257 A1 | 10/2009 | Klinger et al. | |
| 2010/0066685 A1* | 3/2010 | Cain et al. | 345/173 |
| 2010/0284036 A1* | 11/2010 | Ahn et al. | 358/1.15 |
| 2011/0087955 A1* | 4/2011 | Ho et al. | 715/230 |
| 2011/0191692 A1* | 8/2011 | Walsh et al. | 715/752 |
| 2012/0036423 A1* | 2/2012 | Haynes et al. | 715/230 |
| 2012/0038667 A1* | 2/2012 | Branson et al. | 715/757 |
| 2012/0047455 A1* | 2/2012 | Yuan et al. | 715/781 |
| 2012/0173659 A1* | 7/2012 | Thaxter et al. | 709/217 |
| 2012/0210203 A1* | 8/2012 | Kandekar et al. | 715/230 |
| 2013/0239020 A1* | 9/2013 | Heo et al. | 715/753 |
| 2014/0281960 A1* | 9/2014 | Bank et al. | 715/705 |

OTHER PUBLICATIONS http://en.wikipedia.org/wiki/Comparison_of_e-book_formats, dated Oct. 4, 2011, pp. 1-25.

* cited by examiner

COMPUTER DEVICE FOR READING E-BOOK AND SERVER FOR BEING CONNECTED WITH THE SAME

RELATED APPLICATIONS

The subject application is a continuation application of U.S. patent application with Ser. No. 13/250,805, filed 30 Sep. 2011, the entire content of which is herein incorporated by reference.

BACKGROUND OF THE INVENTION

The present disclosure relates to a computer device for reading an e-book and servers connected with the computer device.

Formats of e-books may include, but are not limited to, what may be described in the Webpage <http://en.wikipedia.org/wiki/Comparison_of_e-book_formats> and thus may not be described herein in detail for the sake of brevity.

Conventional e-book reading devices, such as KINDLE (device) of AMAZON or NOOK of BARNES and NOBLE, may work by downloading e-books through a network or a 3G mobile phone network, such that users may read the e-books.

Furthermore, ordinary personal computers, handheld electronic devices, and mobile phones (such as IPHONE or IPOD TOUCH of APPLE) may also function as e-book reading devices when installed with an e-book reading program. Examples of e-book reading programs may be ACROBAT READER of ADOBE, KINDLE (software) of AMAZON, and MICROSOFT READER of MICROSOFT.

BRIEF SUMMARY OF THE INVENTION

In an embodiment, a computer device for reading an e-book may comprise a content navigator configured to present content to a user according to a command from the user. The computer device may further comprise a processing unit in communication with the content navigator configured to execute an application, communicate with a server, acquire a content identifier corresponding to the content presented by the content navigator, send the content identifier to the server, and receive from the server a message associated with the content. The computer device may additionally comprise an output unit in communication with the processing unit configured to output the message to the user. The e-book may include at least the content identifier corresponding to the content and may include the content.

In an embodiment a network service server may comprise a database configured to store a plurality of service data. The network service server may further comprise a searching module configured for searching the database according to a content identifier sent from a computer device, and further configured to select a corresponding service data from the plurality of service data. The server may be configured to generate a message according to the corresponding service data and return the message to the computer device. The server may be configured to be in communication with the computer device via a network. The server may be configured to receive the content identifier from the computer device and to return the message to the computer device.

In an embodiment, a method may comprise presenting e-book content to a user according to a command from the user via a content navigator included in a computer device. The method may further comprise acquiring a content identifier corresponding to the e-book content presented by the content navigator included in the computer device. The method may additionally comprise sending the content identifier to a server via the computer device. The method may also comprise receiving from the server a message associated with the e-book content via the computer device. Moreover, the method may comprise outputting the message to the user via the computer device. The e-book may include the e-book content and at least the content identifier corresponding to the e-book content.

In an embodiment, a computer program product may reside on a computer readable storage medium having a plurality of instructions stored thereon, which, when executed by a processor, may cause the processor to perform operations comprising presenting e-book content to a user according to a command from the user via a content navigator. The operations may further comprise acquiring a content identifier corresponding to the e-book content presented by the content navigator. The operations may additionally comprise sending the content identifier to a server. The operations may also comprise receiving from the server a message associated with the e-book content. The operations may additionally comprise outputting the message to the user. An e-book may include the e-book content and at least the content identifier corresponding to the e-book content.

Reference throughout this specification to features or similar language does not imply that all of the features that may be realized with the present invention should be or are in any single embodiment of the invention. Rather, language referring to the features is understood to mean that a specific feature or characteristic described in connection with an embodiment is included in at least one embodiment of the present invention. Thus, discussion of the features and similar language, throughout this specification may, but do not necessarily, refer to the same embodiment.

Furthermore, the described features and characteristics of the invention may be combined in any suitable manner in one or more embodiments. One skilled in the relevant art will recognize that the invention may be practiced without one or more of the specific features of a particular embodiment. In other instances, additional features and may be recognized in certain embodiments that may not be present in all embodiments of the invention.

DETAILED DESCRIPTION OF THE INVENTION

Figure 1:
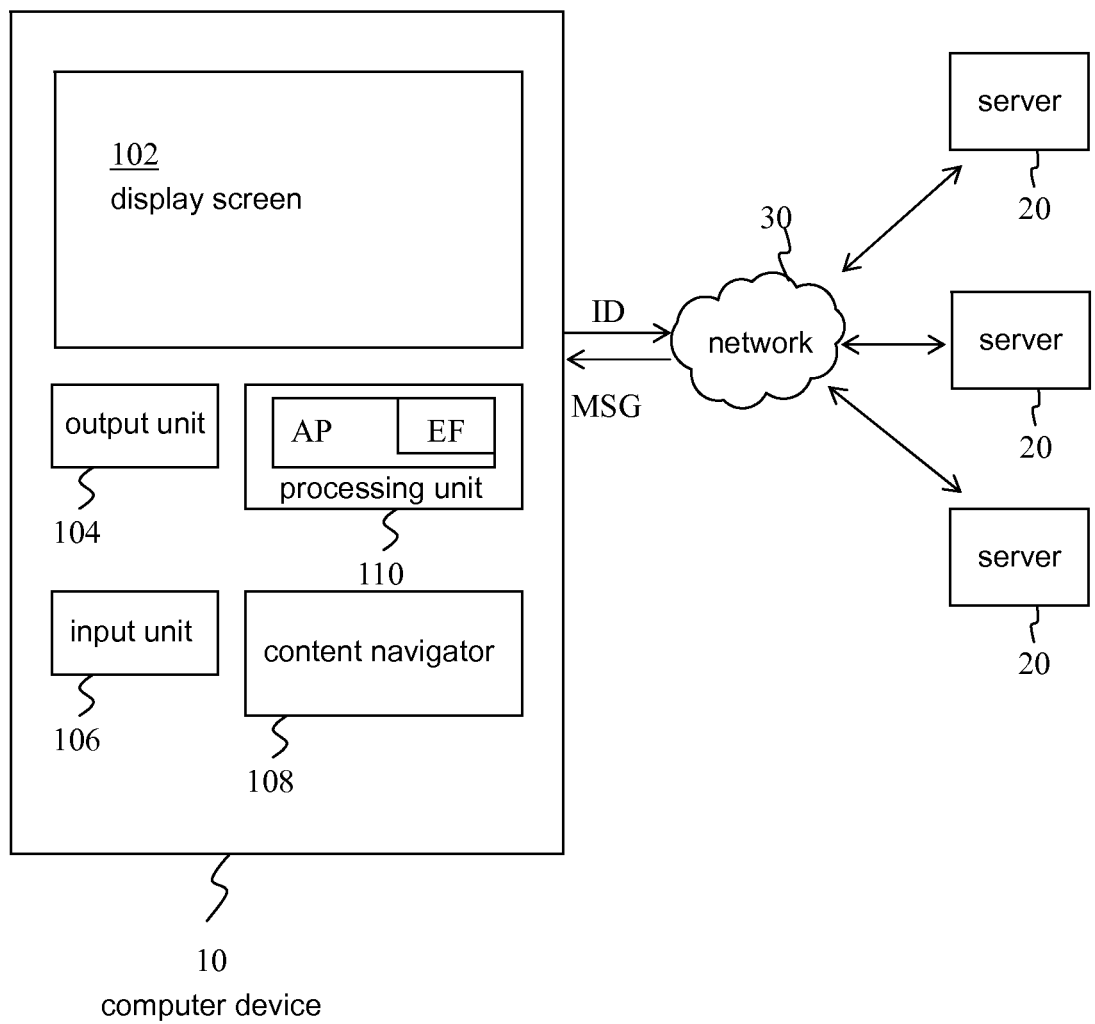
FIG. 1 is a computer device according to an embodiment of the present disclosure.

In an embodiment, one or more features described in the present disclosure may include detecting by an e-book reading device a content of an e-book being read by the user and sending a content identifier to a server, feeding by the server a message related to the content back to the e-book reading device, such that the user may be provided with additional reference information while reading the e-book.

In an embodiment, one or more features described in the present disclosure may include returning a message to a computer device. Servers may provide information other than the e-book being read by the user, which may be annotations related to the content of the e-book, background data about the e-book, a translation of the e-book, and comparison of versions of the e-book. Furthermore, the servers may also provide a social networking service such that, after logging in the social networking service, the user may publish or read annotations or comments with respect to a specific content. The servers may also allow two social networking service members to conduct real-time communication or instant messaging with each other while they may be reading the same or related content.

In an embodiment of the present disclosure, the e-book may include at least a content identifier corresponding to a content of the e-book. The computer device may include a content navigator configured to present the content according to a command from the user, a processing unit configured to acquire the content identifier corresponding to the content presented by the content navigator, send the content identifier to a server, and receive a message returned by the server and related to the content. The computer device may also include an output unit configured to output the message to the user.

In an embodiment of the present disclosure, the server may include a database configured to store a plurality of service data, and a searching module configured for searching the database according to the content identifier sent from the computer device, so as to select a corresponding service data from the plurality of service data. The server may generate the message according to the corresponding service data and may return the message to the computer device.

It should be noted that the features or operations described in the present disclosure may be performed entirely by a client device, a computer device, or a server, or may be performed partially by the client device, the computer device or the server, or may be performed by a combination of two or more of the client device, the computer device, or the server. In an embodiment, the computer device may be a client device.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Referring now to FIG. 1 through FIG. 4, a system, devices, methods, and computer program products are illustrated as structural or functional block diagrams or process flowcharts according to various embodiments of the present invention. The flowchart and block diagrams in the Figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The "content identifier" disclosed herein may be adapted to identify the position of a specific content of an e-book. Hence, the design of the structure of the e-book of the present invention may embody the concept of the "position" of the content, such that a computer device of the present invention or software may position a specific content of the e-book. Accordingly, the "content identifier" described herein may pertain to the design of the content structure of the e-book but may have nothing to do with the content per se. For example, an empty content may also be set to a content identifier.

The EPUB format of an e-book may be used as an example to further illustrate the "content identifier" of the present invention. However, persons skilled in the art may understand that other e-book formats may be applicable to the present invention, too.

For the EPUB formats of e-books, one may refer to a lecture (http://www.daisy.org/epub/) delivered on EPUB at DAISY (Digital Accessible Information System) Consortium. In the EPUB format, an e-book may comprise the following metadata: title, language, and book identifier (such as ISBN). The book identifier described herein may be intended to identify the e-book (as opposed to other e-books) and thus may be different from the content identifier described herein.

In the EPUB format, the contents of the e-book in its entirety may comprise multiple files (XHTML documents). In a "manifest" tag of an OPF file or in a "navmap" tag of an NCX file, each content file (XHTML document) may have an item ID, such as "title," "abstract," "Part 1," "Chapter 1," or "Appendix". The item ID may be unique to each of the files (items) which together may form the e-book and thus does not vary with the layout (such as page size and font size) of the e-book displayed on a reading device; hence, item ID may function as a content identifier of the e-book configured for identifying a specific content (such as the content of a specific chapter or paragraph).

The above-mentioned example is illustrative, rather than restrictive, of the present invention. For example, an e-book with the EPUB format may be basically free of "page number," though it may be feasible to set an identifier for a content of the e-book by means of a "pagetarget" tag that may be additionally extended and defined in an NCX file, such that the identifier of the "pagetarget" tag may function as the content identifier for identifying a specific content (corresponding to a content of a specific page in a physical book, for example). Nonetheless, a "page number" defined with the "pagetarget" tag may be different from a "page number" that may be dynamically created by a reading device for the purpose of the layout of the e-book. The latter may be likely to vary with a user's setting (such as font size). Hence, the former may be the content identifier of the present invention, but the latter may not. ADOBE may employ a page-map tag developed by EPUB to embed page numbers of a physical book in e-books, such that it may be used as the content identifier of the present invention.

FIG. 1 is a block diagram of a computer device 10 according to an embodiment of the present invention. The computer device 10 may be capable of network connection and thus may be connected to or in communication with one or more servers 20 via a network. In particular, the computer device 10 may comprise a display screen 102, an output unit 104, an input unit 106, a content navigator 108, and a processing unit 110.

It should be noted that the computer device 10 may be implemented with an ordinary personal computer or notebook computer. Computer device 10 may be an e-book reading device, that is, it may be a dedicated device such as the KINDLE (device) of AMAZON or NOOK of BARNES and NOBLE. The display screen 102 may be an electronic paper display screen for presenting the e-book to the user. The output unit 104 may output a prompt message other than the e-book to the user; hence, the output unit 104 may be another display screen independent of the display screen 102 (please refer to NOOK of BARNES and NOBLE) or may be integrated with the display screen 102 to not only enable the display screen 102 to display the e-book but also allow the display screen 102 to function as the output unit 104 for displaying the prompt message. However, the output unit 104 may not be limited to a display screen, the output unit 104 may also be an audio output unit for outputting an audio message.

The input unit 106 may be a keyboard, a touch pad, or a touchscreen which may be integrated with the display screen 102. The user may enter an e-book navigation command (for scrolling or going to a specific chapter or paragraph) with the input unit 106. The content navigator 108 may be configured to display the content anticipated by the user on the display screen 102 according to the navigation command.

The processing unit 110 may be configured to execute an application AP and to communicate with the servers 20. For example, the processing unit 110 may be configured to download an e-book from the servers 20 and send the e-book to the computer device 10. Or, alternatively, the processing unit 110 may be configured to upload to the servers 20 any data entered by the user with the input unit 106 or any data stored in the computer device 10.

The processing unit 110 may be connected to or in communication with the content navigator 108 and may communicate therewith. Once the content navigator 108 displays the content anticipated by the user on the display screen 102 according to the navigation command, the application AP may be configured to and may fetch the content identifier ID corresponding to the content, send the content identifier ID to the servers 20, receive a message MSG returned by the servers 20 and related to the content, and send it to the user by the output unit 104 such that it may function as a prompt for the user.

The application AP may be configured to send user data (such as nationality, phone number, email account, social network info, security preference etc) to the servers 20 as needed, such that the user data may enable the servers 20 to identify the user of the computer device 10 and thus may enable the servers 20 to return the message MSG suitable for the user.

In an embodiment, the application AP may comprise an extension framework EF configured for providing one or more communication interfaces whereby the application AP may communicate with one or more services which may be available on the servers 20. For example, with the extension framework EF, the application AP may login a social networking service (to be described later) provided by the servers 20. Alternatively, the application AP, may be coupled with the servers 20, configured to perform data mining based on a record of the content identifier ID in conjunction with the user's reading status data sent to the server 20 when reading, such as user's reading date and time information, location information (if the computer device is equipped with a GPS), to analyze the user's reading characteristics (such as reading speed, content preference, reading hours, or reading frequency etc.) or, when the user data are available, to even further analyze the correlation between the user's characteristics (such as age, gender, marital status, and/or domicile etc.) and the user's reading characteristics. Alternatively, the application AP may work in conjunction with the servers 20 which may be applicable to the Reading Merit Badge of U.S.

Scouting Service Project, for example, in carrying out a follow-up assessment of participants' reading achievements with the content identifier ID. The servers 20 also may be configured to provide a recommendation service whereby book references may be given to various users according to the result of data mining.

The processing unit 110 may be configured to send a metadata (such as title, language, or ISBN) of the aforesaid e-book to the servers 20 as needed, such that the metadata may enable the servers 20 to recognize an e-book currently being read by the computer device 10. However, for the sake of brevity, some embodiments may presume that the computer device 10 is specially designed and may only read a preset e-book; hence, the processing unit 110 may not necessarily send a metadata of an e-book to the servers 20.

Figure 2:
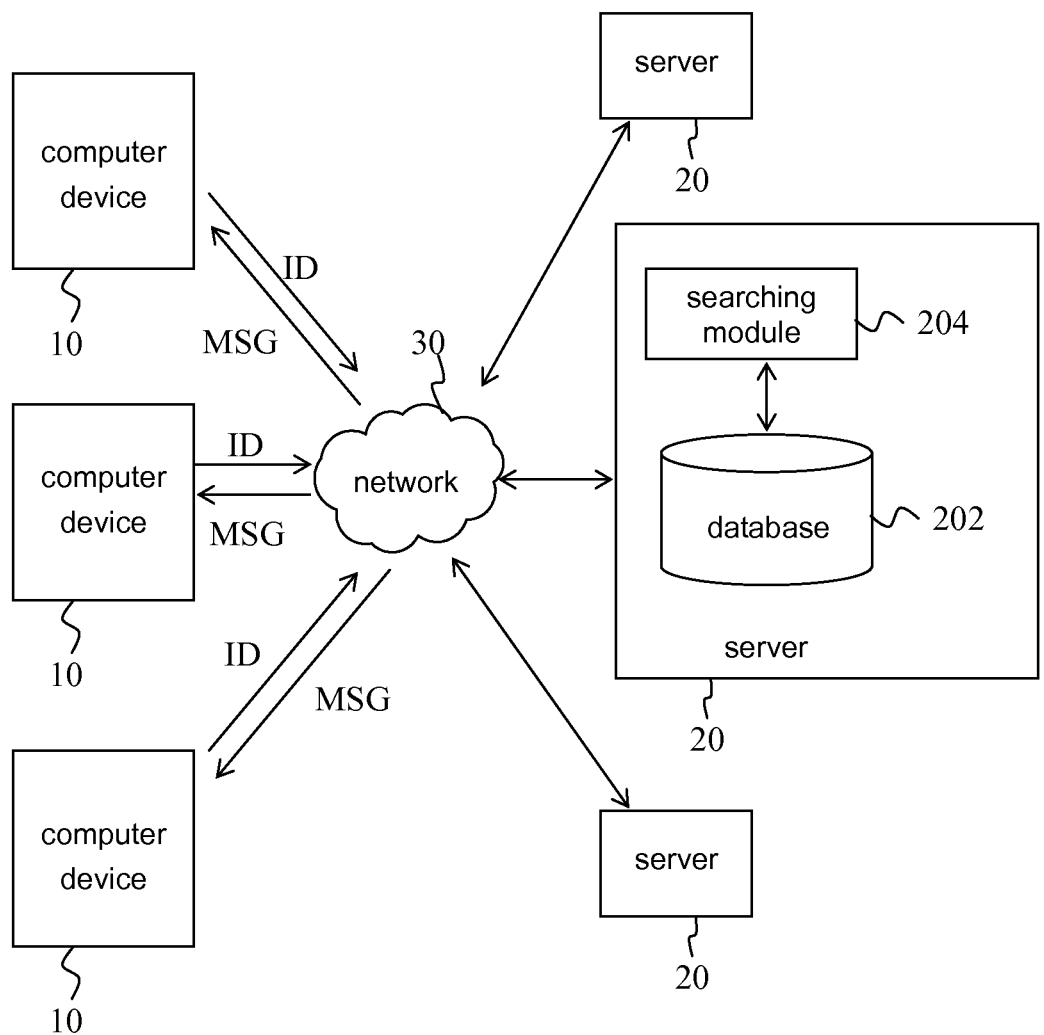
FIG. 2 is a schematic view of servers according to an embodiment of the present disclosure.

FIG. 2 may be a schematic view of networking service servers 20 according to an embodiment of the present invention. Each of the servers 20 may be in communication with one or more said computer devices 10 via the network 30. For example, the servers 20 may be configured to allow the computer device 10 to download an e-book. Alternatively, the computer device 10 may be configured to upload data stored therein to the servers 20. In particular, the servers 20 may be configured to receive from the computer device 10 the content identifiers ID of e-books, compare the content identifiers ID according to a predetermined rule, and return to the computer device 10 messages MSG related to specific contents of the e-books. The messages MSG may include text, pictures, sound, video, or a multimedia message resulting from a combination thereof.

The servers 20 may be implemented in the form of IBM Blade Center or System X server.

A server 20 may be in communication with a client device 10 via the network 30. The network 30 may be any type of network such as the Internet, a local area network (LAN), a wide area network (WAN), a virtual private network (VPN), etc. In any event, communication between the server 20 and the client device 10 may occur via a direct hardwired connection (e.g., serial port), or via an addressable connection that may utilize any combination of wire line and/or wireless transmission methods. Moreover, conventional network connectivity, such as Token Ring, Ethernet, WiFi or other conventional communications standards may be used. Still yet, connectivity may be provided by conventional TCP/IP sockets-based protocol. In addition, it should be understood, however, that although not shown, other hardware and software components (e.g., additional computer systems, routers, firewalls, etc.) may be included in the network 30.

In an embodiment, the servers 20 may comprise a database 202 and a searching module 204. A plurality of service data may be stored in the database 202. The searching module 204 may have the content identifier ID and a match table (not shown) of service data, and searches the database 202 according to the content identifier ID sent from the computer device 10, and may be configured to select appropriate corresponding service data from the database 202. The servers 20 may be configured to generate a message MSG according to the selected corresponding service data and return the message MSG to the computer device 10. The corresponding service data may comprise any data related to an e-book content identified by the content identifier ID, that is, information which is not related to the e-book per se, including an annotation related to the content, background data, a translation, a version comparison, or even an advertisement which may be placed in an attempt to appeal to the user.

In an embodiment, the computer device 10 may be configured to provide the user data for the servers 20, and the searching module 204 may comprise the content identifier ID, the user data, and a match table (not shown) of service data, and may be configured to search the database 202 according to the user data and the content identifier ID sent from the computer device 10, so as to select corresponding service data from the database 202.

Also, as shown in FIG. 2, it may be feasible that some of the servers 20 do not comprise the database 202 and the searching module 204. For example, some of the servers 20 may be dedicated to taking charge of the fundamental operation (to be described later) of the social networking service. Alternatively, some of the servers 20 may be configured to analyze (i.e. the aforesaid data mining) the user's behavior pertaining to reading the e-book according to the content identifier ID sent from the computer device 10, and may be configured to return the analysis result to the computer device 10 by the message MSG. For example, the servers 20 may be configured to analyze the user's reading speed by making reference to the time taken by the computer device 10 to convey the content identifier ID. This embodiment may apply to testing students' reading performance.

Figure 3:
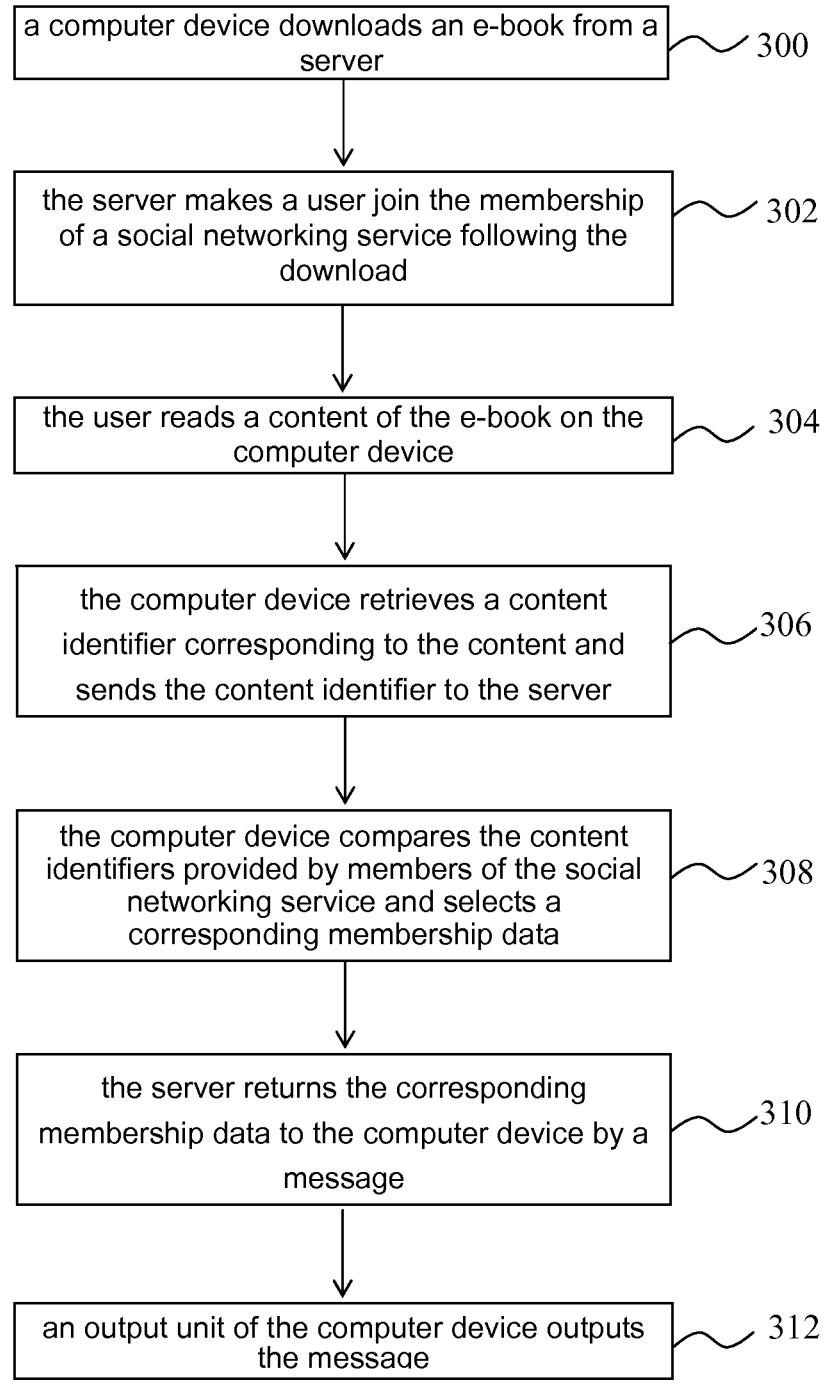
FIG. 3 is a flowchart according to an embodiment of the present disclosure.

FIG. 3 may be a flowchart of an embodiment of the present invention. As shown in FIG. 3, a social networking service in an embodiment of the present invention is illustrated with reference to the computer device shown in FIG. 1, and the networking service servers shown in FIG. 2. A social networking service, may be, for example, FACEBOOK, PLURK, TWITTER, and ORKUT; hence, details of a social networking service may not be described herein in detail for the sake of brevity. The social networks disclosed herein may not necessarily be open social networking services otherwise described in the above examples. In an embodiment, for the sake of brevity, a social networking service may be implemented in the form of a private social networking service, wherein only readers (or buyers) of a preset e-book are eligible to become members of the social networking service, which is further described below. However, persons skilled in the art should understand that the present invention is not limited thereto.

It should be noted that, in an embodiment, a social networking service may be provided by one or more said servers 20. Multiple said servers 20 may be available as shown in FIG. 1 and FIG. 2, and this embodiment is not restrictive of the positions of the servers 20, wherein the servers 20 are connected to or in communication with each other via the network 30. Furthermore, a social networking service provided by the servers 20 may not necessarily be operated by the servers 20 to the full; instead, the servers 20 may be constructed on another existing social networking service (such as FACEBOOK, PLURK, TWITTER, and ORKUT) to form a virtual group, wherein one of the servers 20 may be configured to take care of the administrative work performed on the virtual group.

In operation 300, the computer device 10 may be configured to download an e-book from the servers 20. The e-book may include the "content identifier" corresponding to a specific content of the e-book. The user of the computer device 10 may have to enter the user data into the servers 20 before downloading an e-book, such that the servers 20 may be configured to create a correlation between the user and the downloaded e-book.

In operation 302, in response to the e-book downloading operation, the servers 20 may be configured to automatically make and may automatically make the user join the membership of a social networking service (or a virtual group on an existing social networking service), and may be configured to give and may give the user an authority that entitles the user to access the social networking service with the computer device 10, such that the user may be enabled to login the servers 20 with the computer device 10 to access the social networking service. In an embodiment, if the servers 20 allow more than one said e-book to be downloaded, the user who is going to login the servers 20 may otherwise request that the title or the book identifier (such as ISBN) be included in the login data, so as to participate in a group in the social networking service, wherein the group corresponds to the e-book.

In operation 304, the user may be enabled to read the downloaded e-book on the computer device 10 and may enter a navigation command with the input unit 106, such that the content navigator 108 may be configured to display and may display the content anticipated by the user on the display screen 102 according to the navigation command. In operation 306, the application AP of the computer device 10 may be configured to fetch and may fetch the content identifier ID corresponding to the content displayed in operation 304, and may be configured to send and may the content identifier ID to the servers 20. If a connection between the servers 20 and the computer device 10 is not built before the content identifier ID is sent to the servers 20, it may be that the application AP has to login the servers 20 and the social networking service with the user data.

In operation 308, after the servers 20 may have received the content identifier ID of the computer device 10, the searching module 204 of the servers 20 may be configured to and may search for and collect the content identifier ID provided by other members of the social networking service and related to the e-book (in operations 300-306 as well, for example), and may be configured to and may compare the content identifier ID provided by other members of the social networking service and related to the e-book with the content identifier ID of the computer device 10, so as to make a member shortlist as a result of screening the membership and then select corresponding membership data from the database 202 according to the member shortlist. For example, the searching module 204 may make the member shortlist by setting the screening criterion to equality of content identifiers ID. Or, alternatively, it may be that the screening criterion may be based on content identifiers ID which may be different and yet corresponding to each other according to a predetermined rule (such as the content identifier ID related to consecutive chapters or paragraphs). Furthermore, the aforesaid corresponding membership data may comprise the members' contact information, the members' reading status with regard to the e-book, as well as annotations or comments made by the members, related to an e-book or even related to a content corresponding to the content identifier ID of the e-book, and published on the social networking service.

It should be noted that, in operation 308, by comparing the content identifiers ID, the searching module 204 may be configured to and may substantially screen out members who are currently reading identical or relevant contents of the e-book. As mentioned earlier, the content identifier ID may correspond to the position of a content but may have nothing to do with the content per se; hence, the present disclosure may be applicable, provided that e-books have the same content identifier ID design (such as the same chapter/paragraph design) and encompass different revision versions, different language versions, and even different e-book formats.

Figure 4:
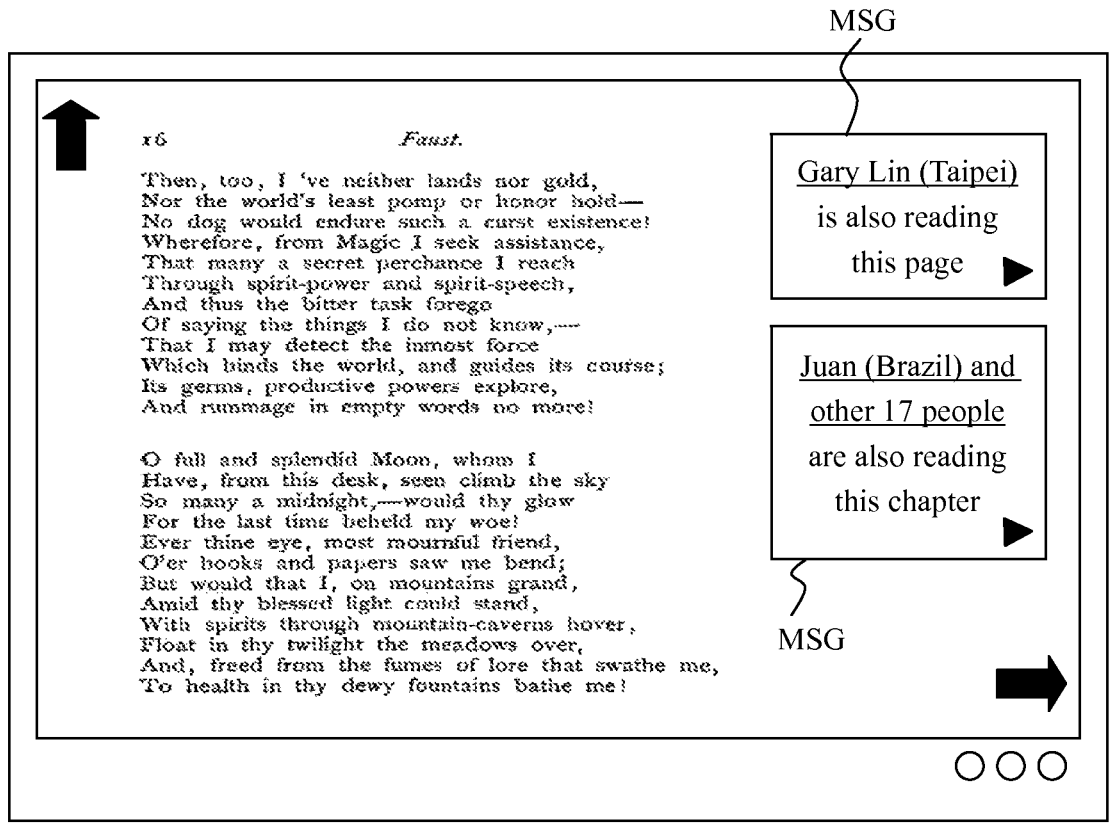
FIG. 4 shows an example of a message provided by the servers and related to a content of an e-book.

In operation 310, the servers 20 may be configured to and may return the corresponding membership data to the computer device 10 by a message MSG so as to respond to the content identifier ID sent in operation 306 from the computer device 10. In operation 312, the output unit 104 of the computer device 10 may be configured to and may output the message MSG shown in FIG. 4, so as to present a corresponding membership data to the user. It should be noted that, for example only, the message MSG in FIG. 4 shows only a member name and a reading status (the same chapter or the same page). However, the message MSG may be further expanded to show more membership data, if the user clicks on (or touches) the triangular pointer at the lower right corner. For example, the additional membership data may include annotations or comments made by the members, related to a corresponding content, and published on the social networking service, or any data published on a social network by the members and permissibly shared by the users of the computer device 10.

After operation 312, optionally, the users of the computer device 10 may also enter annotations or comments on the content corresponding to their content identifiers ID, and then the annotations or comments may be sent to the servers 20 by the processing unit 110 and published on the social networking service. Or, alternatively, the users of the computer device 10 may click on the message MSG in FIG. 4 to perform real-time communication with the members by means of the social networking service.

In operation 308 of the aforesaid embodiment, the searching module 204 may be configured to and may compare the content identifier ID provided by other members and related to the e-book with the content identifier ID of the computer device 10. However, in an embodiment, the searching module 204 may be configured to and may compare other data related to other members with the content identifier ID of the computer device 10. For example, the searching module 204 may record: member A is the author of chapter 1 of the e-book. Hence, if the content identifier ID of the computer device 10 matches chapter 1 of the e-book, the searching module 204 may select the membership data of member A from the database 202 and treat it as the corresponding membership data.

The foregoing embodiments are provided to illustrate and disclose the technical features of the present disclosure, and are not intended to be restrictive of the scope of the present disclosure. Hence, all equivalent variations or modifications made to the foregoing embodiments without departing from the spirit embodied in the present disclosure should fall within the scope of the present disclosure as set forth in the appended claims.

As will be appreciated by one skilled in the art, aspects of the present invention may be embodied as a system, apparatus, method or computer program product. Accordingly, and as mentioned above, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described below with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method comprising:
presenting e-book content to a user according to a command from the user via a content navigator included in a computer device;
acquiring a content identifier corresponding to the e-book content presented by the content navigator included in the computer device;
sending the content identifier to a server via the computer device;
comparing the content identifier with one or more other content identifiers from one or more other computer devices corresponding to the e-book content;
matching the content identifier with a data store to identify service data in the data store, wherein the service data in the data store includes a reading status of a respective computing device of the one or more other computing devices;
selecting the service data based upon, at least in part, the content identifier;
receiving from the server a message indicating a similar reading status of at least two of the one or more other computer devices associated with the e-book content and the service data, wherein the message and the service data are received based upon, at least in part, the comparison of the content identifier with one or more other content identifiers from one or more other computer devices corresponding to the e-book content; and
outputting the message to the user via the computer device, wherein an e-book includes the e-book content and at least the content identifier corresponding to the e-book content.

2. The method of claim 1, further comprising providing an electronic paper display screen for displaying the e-book content.

3. The method of claim 1, wherein the message is a multimedia message.

* * * * *